Figure 6:
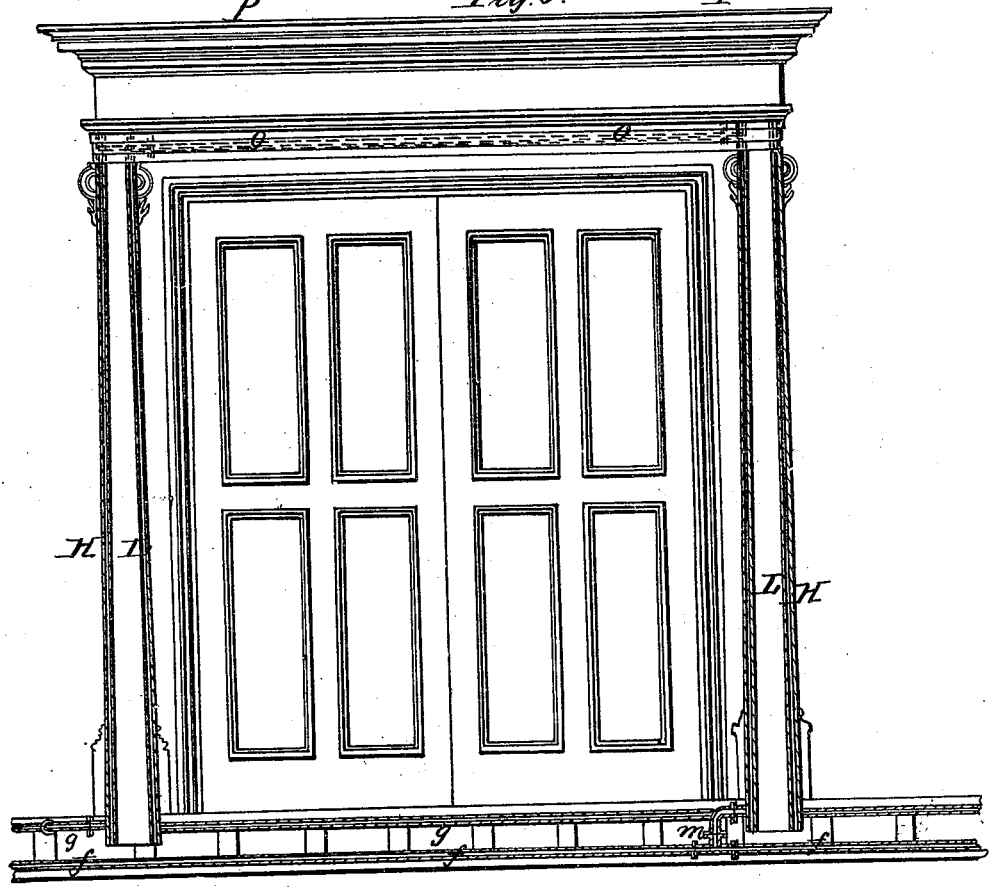

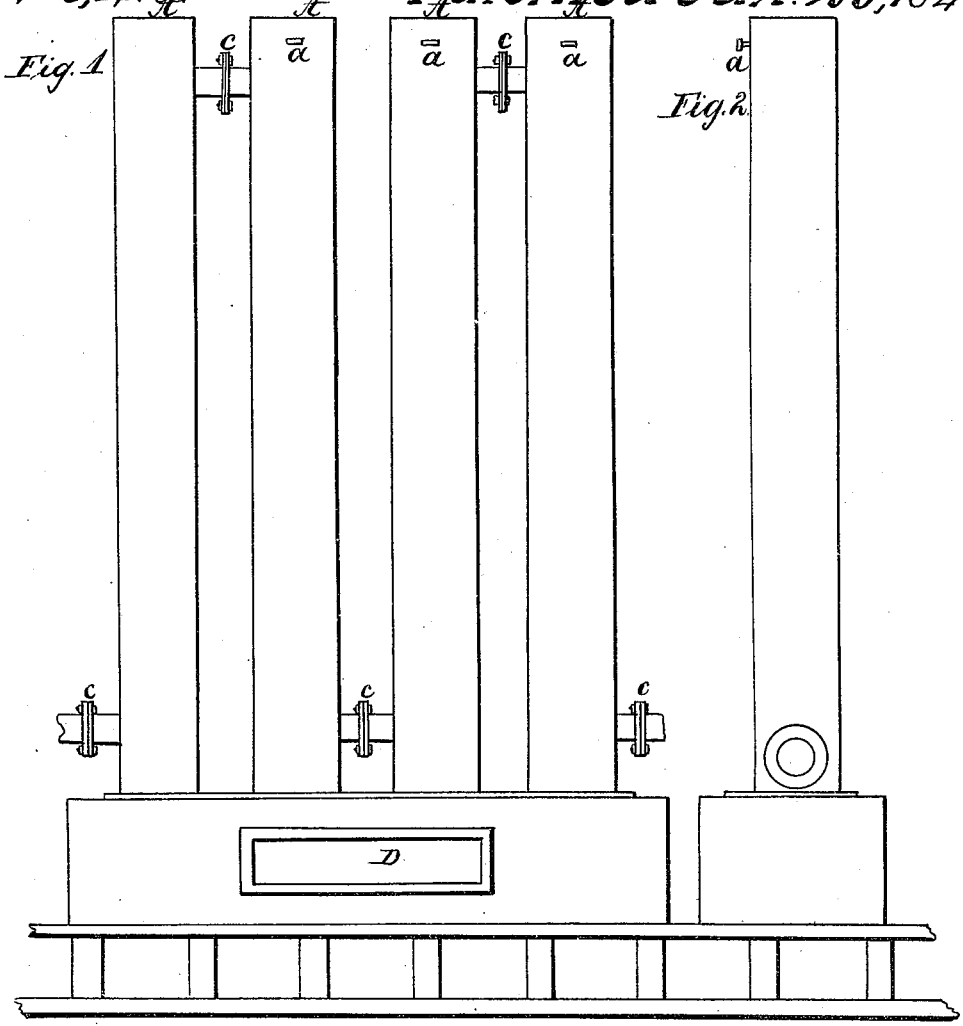

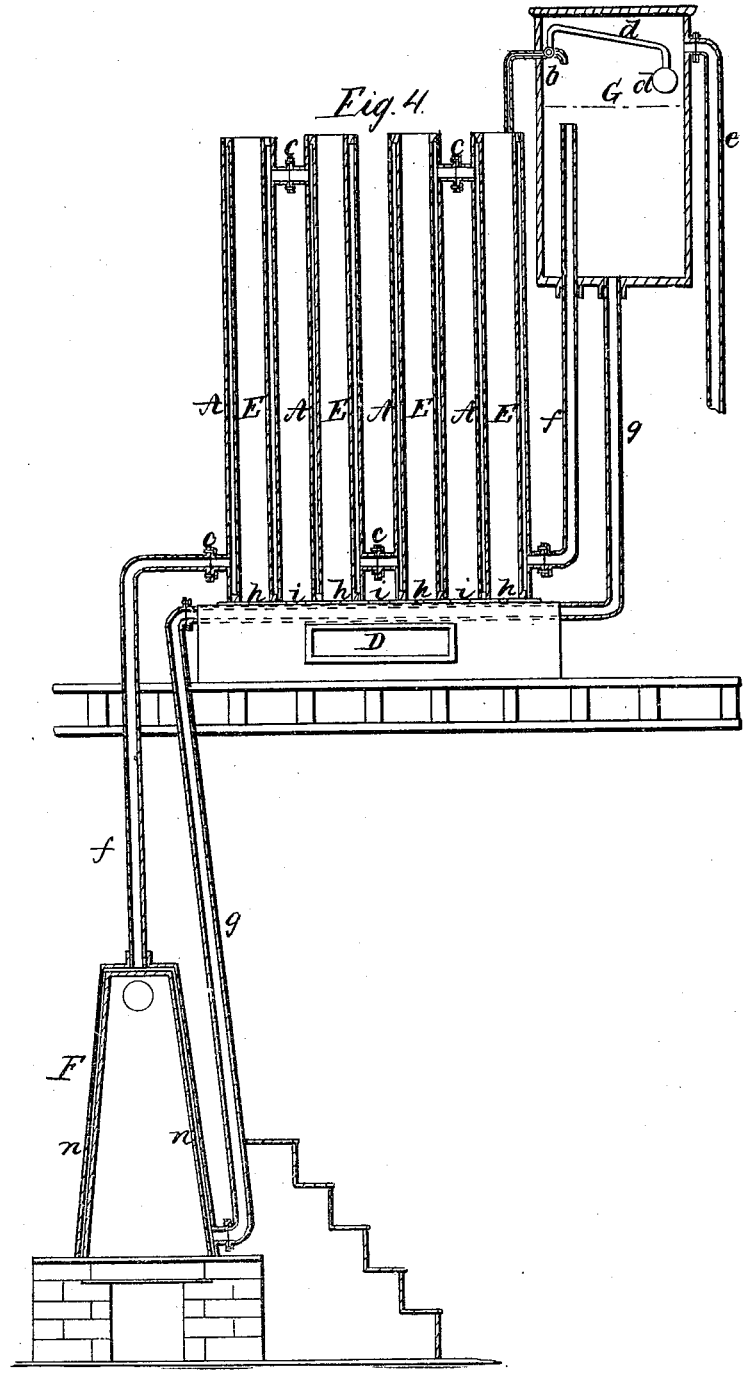

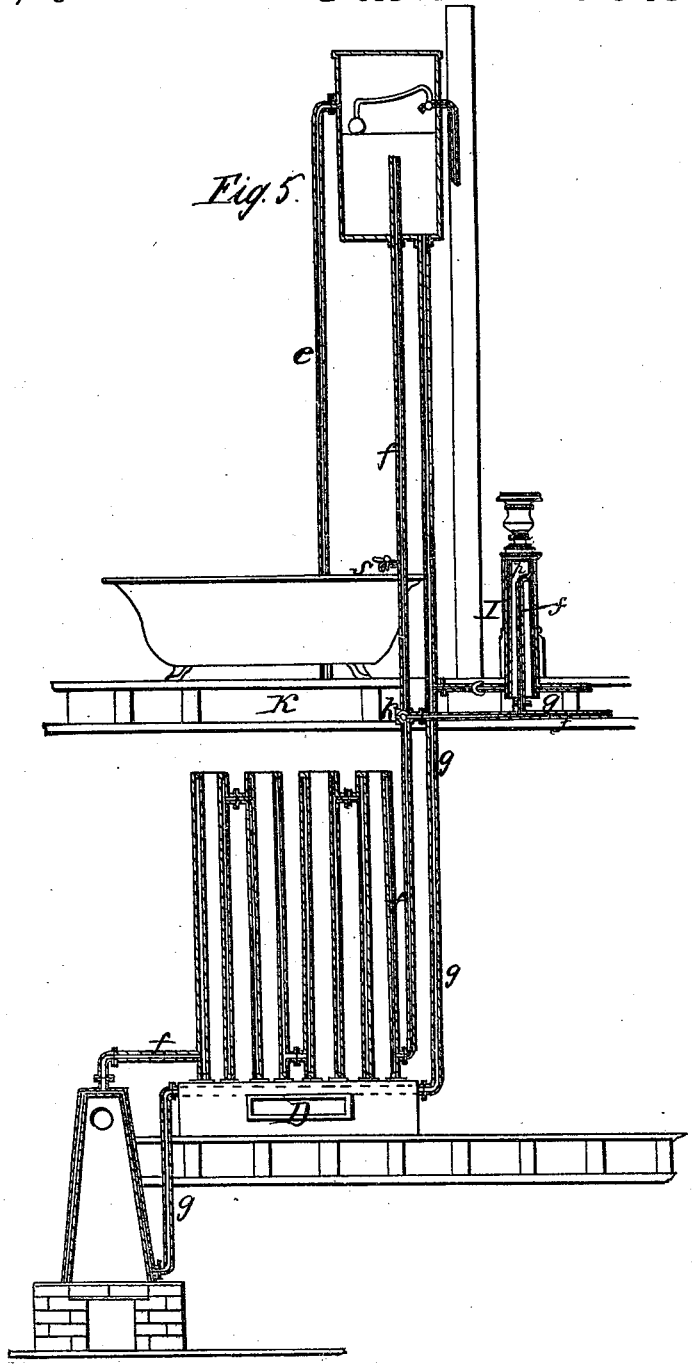

Sheet 4, 4 Sheets.

A. E. Hitchings.
Hot Water App's.

Nº 5,418.   Patented Jan. 25, 1848.

UNITED STATES PATENT OFFICE.

ANTHONY E. HITCHINGS, OF NEW YORK COUNTY, NEW YORK.

HOT-WATER APPARATUS FOR HEATING BUILDINGS.

Specification of Letters Patent No. 5,418, dated January 25, 1848.

*To all whom it may concern:*

Be it known that I, ANTHONY E. HITCHINGS, in the county of New York and State of New York, have invented a new and improved mode of heating buildings, either private or public, conservatories, or any other inclosure where heat is required, with hot water below the temperature of boiling; and I do hereby declare the following is a full and exact description.

The nature of my invention consists in providing a series of double cylinders connected together first at top and then at bottom and both ends of the series with a boiler so that the water heated in the boiler shall ascend in the space between the two first cylinders down between the second set then up between the third set and so on to the end and then delivered to the boiler, the circulating force given to the water by heat being sufficient to enable it to ascend and descend more than once. Each set of double pipes or cylinders is thus constituted a heater that radiates heat from the two surfaces. Instead of making these round they may be of any other form.

To prevent accidents from overheating of the water, and to keep it at its proper level, I have applied a ball cock and waste pipe to the reservoir.

To enable others skilled in the art to make and use my invention, I will proceed to describe its construction and operation.

Figure 1 represents several cylinders as A, A, A, &c., standing on an air box B and connected with each other above and below by the pipes c, c, c, c, through which the water passes from one cylinder to the other. a, a, a, &c., are screw plugs to allow the air to escape when charging the cylinders with water. D is an opening in the box through which the cold air is supplied to be heated by the cylinders. Fig. 2 is an end view of Fig. 1. Fig. 3, is a ground plan of the same. Fig. 4, represents a longitudinal vertical section of the apparatus with the manner of operation, &c.

A, A, A, &c., are the outside cylinders; E, E, E, E, the inside cylinders. F is the boiler by which the water is heated, which may be seen at n, n; when hot it passes up the pipe f into the cylinder, A, and between it and the cylinder E around which it circulates, and is forced to the top, and through the pipe c to the second cylinder, down this and through connecting pipe to the third, and then to the fourth, or as many as may be used, from the last it is forced into the reservoir, G, which is filled a few inches above the pipe, from here the water escapes down the return pipe, g, through the air box into the lower side of the boiler, where it is again heated and performs the same revolution as we have just described.

G, is the reservoir filled with water to about 6 inches above the top of the hot water flow pipe, f.

b is a cold water supply pipe, d, d, a ball cock attached. When the water becomes heated to boiling temperature, it swells in the reservoir, rises up, and flows out through the waste pipe e then immediately falls below its former water line, and with it the ball and lever d which opens the cock in the supply pipe b and lets it in upon that already in the reservoir, filling it up to its former line, furnishing always an even head of water, and by reducing its temperature preventing the possible accumulation of steam.

In the ordinary manner of heating houses by water a single pipe is used filled with a solid column of water as at f by this method the cylinder can only radiate heat from the outside, besides the expense delay and trouble of heating such an immense body of water, as is needed to supply the requisite warmth. The superior advantages of the improvement I propose will readily be seen by referring to Fig. 4. D, is an opening in the air box by which the cold air is drawn from the street, it then passes through the openings h, h, h, h, up the inside of the cylinders, and escapes hot out of the top into the building. i, i, i, are openings on the outside of the cylinders by which the remainder of the air is heated that does not ascend the inside of the column, as may be seen by referring to the ground plan.

Accurate calculations have convinced me that three times the amount of heat, and nearly three times the radiating surface can be obtained with the same amount of water or area of pipe with my apparatus as with that now in operation.

Figs. 5 and 6 are the sections of a house with the boiler pipes, &c., showing the manner in which I intend to arrange them. Fig. 6 is the interior of a room with folding doors, and on each side of them, and in the corners of the room are cast iron columns as at H, H, I, I. Smaller columns are fitted on the inside of these as L, L, p, p, between which there is a space of about ½ to ¾ of an inch for the water to circulate. On this same floor may be seen a bath which may be supplied with hot water, by turning the three way cock k and the smaller cock s attached to the pipe f.

Figure 7:

To describe the full operation, let Fig. 5 represent the lower story or basement of a house, with the same arrangement of cylinders and pipes on a smaller scale as at Fig. 4. The water rises up the pipe f to the three way cock k', from there it passes under the floor, and by the small bend m to the second columns L, H; between these it flows to the top, and then through the connecting pipe o, o, to the first column, down this and through the return pipe g, g, until it again finds its way to the boiler. In the corners are smaller columns fitted up in the same manner as those we have described. The hot water flows into the column through a smaller branch of the pipe, f, then down and out to the return pipe g. A space between the floors and around the pipes is inclosed from the opening K by which the air is supplied from the lower story or the street, and ascends through the column L, L, and out of the top of the cornice P, P, which is pierced with small vents to allow the air to escape into the room as may be seen in the ground plan Fig. 7.

Suppose single columns and pipes had been used, it may easily be seen what an immense quantity of water is needed to supply them, and how slow must be its circulation; indeed I question if the single columns and pipes could be used at all with the arrangement I have just described.

I am aware that buildings have been heated by causing the water from a boiler to ascend and descend through pipes to be delivered to the bottom of the boiler, but in these plans the water has only been made to ascend and then descend, and I am also aware that heated air has been carried through between two cylinders that heat might be radiated from the inner and outer surfaces, and therefore I do not claim these as my invention, but

What I claim as my invention, and for which I desire to secure Letters Patent, is—

The plan of radiating heat by hot water which circulates from a boiler and back to it, and in its circuit passes up and down two or more times through a series of heaters each consisting of two tubes one within the other, the water passing between the two that the outer and inner surfaces of the heaters may radiate heat, and these being so combined as to receive the water from the boiler at one end of the series while the other end gives it out to the boiler and the series of heaters being so connected as to require the water to ascend in one, descend the second, ascend in the third and so on through the series, by the connection of the two ends of the series with the boiler, substantially as described.

ANTHONY ELLIS HITCHINGS.

Witnesses:
   CHARLES F. HITCHINGS,
   I. W. BAILEY.